United States Patent Office 2,854,436
Patented Sept. 30, 1958

2,854,436

COMPOSITIONS DERIVED FROM POLYMERS HAVING A BASIS OF ACRYLONITRILE

Paul Jacques Corbière and Pierre Mosse, Lyons, France, assignors, by mesne assignments, to Crylor, Paris, France, a corporation of France No Drawing. Application July 27, 1954
Serial No. 446,164

1 Claim. (Cl. 260—45.75)

The present invention relates to the stabilisation of compositions having a basis of polymers having a basis of acrylonitrile.

This application is a continuation-in-part of application Serial No. 311,812, filed September 26, 1952, now abandoned.

It is known that filaments, threads, artificial horse-hairs, films and all other moulded or spun objects can be obtained by evaporation of solutions of polymers containing at least 85% of acrylonitrile in their molecule in an appropriate solvent such as, for example, dimethylformamide, dimethyl methoxyacetamide, or mixtures of solvents containing these substances.

Furthermore, it is known that in preparing solutions of these polymers it is necessary to use heat. The effect of this heat, and also of any heat which may be necessary at any further stage, causes the solutions to acquire a more or less pronounced yellow colour, and the resulting products likewise have this yellow colour. Furthermore, it is known that this effect can be diminished without completely avoiding this colouration, by carrying out the process of solution either in the presence of a gaseous inorganic anhydride as described in U. S. Patent No. 2,404,728, or by the incorporation of acid substances in the solvent as described in U. S. Patents Nos. 2,503,244, 2,502,030 and 2,503,245.

The present invention has for its object the production of solutions of polymers of acrylonitrile which can be practically transparent and colourless and of products formed from the evaporation of these solutions which are white and remain white in the course of further thermal treatments. Another object is to provide a process for the preparation of these products.

It has now been found according to the present invention that by carrying out the process of dissolving polymers containing at least 85% of acrylonitrile in their molecule in the presence of one or more stannous salts at a temperature of at least 80° C. solutions are obtained which are clear and colourless. It has likewise been found that the products obtained by the evaporation of these solutions are white and that they do not turn yellow in the course of subsequent thermal treatments.

For carrying out the process of the present invention stannous salts of mineral acids as, for example, the chloride, the sulphate, the nitrate, the bromide or the like can be used and also the stannous salts of organic acids such as the formate, the acetate, the oxalate, the butyrate, the phthalate and the like.

It has been found that a concentration of tin in the form of a stannous salt as low as 0.005% of tin in relation to the weight of the polymer being used, shows an appreciable improvement, and that a concentration of tin between 0.05% and 3% based on the weight of the polymer is particularly suitable, and that in certain cases as much as 15% of tin can be introduced in the form of stannous salt without altering the properties of the polymers and of the articles made therefrom.

The present invention is applicable to polymers of acrylonitrile containing at least 85% of acrylonitrile in their molecule—i. e., a substance selected from the group consisting of polymers, copolymers and interpolymers of acrylonitrile, the remainder being formed of one or more polymerisable components having one or more ethylenic linkages such as vinyl and vinylidene halides, vinyl esters and ethers, acrylic acids and methacrylic acids and their derivatives styrene, vinylimidazole and aminoalkylvinyl ethers.

These polymerised products can be dissolved in a solvent having a boiling point higher than 100° C. or in a mixture of such solvents, or in a mixture of one of these solvents and a non-solvent. As solvents there can be used, for example, dimethylformamide, dimethyl methoxyacetamide, N-formyl-morpholine, cyclobutadiene sulfon, cyclotetramethylene sulfon, p-phenylene-diamine, etc.

For forming a mixture of solvent and non-solvent there can be used, for example, as non-solvent, cyclohexanone, cyclohexanol, hydrocarbons having a boiling point, etc. As is known, the forming of articles or the shaping of polymers having a basis of acrylonitrile dissolved in these solvents or solvent mixtures, requires the use of high temperatures, which in the absence of stannous salts according to the present invention brings about a strong yellow colouration of the manufactured articles.

To carry out the present invention the method varies according to whether the stannous salts are soluble or insoluble in the solvent which is used. When the stannous salt is soluble in the solvent as, for example, stannouschloride in dimethylformamide, one can either incorporate the stannous salt directly in the solvent or one one can dissolve it previously in a small quantity of the solvent. When the stannous salt is insoluble, as, for example, stannous oxalate in dimethylformamide a colloidal suspension can be used.

The solutions thus obtained are suitable for preparing all kinds of articles which are obtained by the evaporation of the solvent such as filaments, threads, artificial horse-hairs, films and moulded objects, etc. Thus, for example, a solution can be extruded through an evaporative atmosphere utilising for this purpose the apparatus described in U. S. Patent No. 2,472,842. Likewise, films can be formed from these solutions by passing them on to a heated metallic surface such as an endless band which brings about the evaporation of the solvent.

The following examples, in which the parts denote parts by weight, illustrate in a non-limitative manner various methods of carrying out the process according to the invention.

Example 1

A composition is prepared containing:

24 parts of polyacrylonitrile
75.5 parts of dimethylformamide
0.5 parts of stannous chloride This composition when dissolved by heating for 30 minutes at 200° C. is extruded at 130° C. through a spinneret having 18 apertures of 0.08 mm. each in an apparatus such as that described in U. S. Patent No. 2,472,842, the walls of the extrusion chamber from the spinneret as far as the exit aperture for the thread being heated to 150° C.

Filaments are obtained having a white colour considerably better than that obtained by spinning under the same conditions an analogous composition but not containing the stannous chloride. The filaments obtained can be stretched in an excellent manner and resemble those not containing the tin and have identical serigraphic qualities.

Example 2

A composition is prepared containing:

20 parts of a copolymer containing 90% acrylonitrile and 10% of vinyl ether of diethyl aminoethanol
76.3 parts of dimethylformamide to which is added a colloidal suspension made by previously grinding together 3.0 parts of dimethylformamide and
0.7 parts of stannous oxalate By dry spinning under the same conditions as those described in Example 1 filaments of a good white appearance are obtained, the mechanical qualities of which are as good as those of the appreciably coloured filaments obtained by spinning under the same conditions a composition which is identical except that it does not contain stannous salt.

Example 3

The following compositions are prepared:

(a)

25 parts of copolymer containing 90% acrylonitrile and and 10% vinylimidazole
74 parts of a solvent containing 98% dimethylformamide and 2% cyclohexanone
1 part of stannous formate (b)

25 parts of a copolymer containing 90% acrylonitrile and 10% vinylimidazole
75 parts of solvent containing 98% dimethylformamide and 2% cyclohexanone The two compositions (a) and (b) were heated at the following increasing times and cast into films under the same conditions on a surface heated to 140° C.

Time of heating of the compositions:

|     | 3 hours | 5 hours | 8 hours |
| --- | --- | --- | --- |
| (a) | white | light yellow | yellow. |
| (b) | yellow | deep yellow | brown. |

Example 4

The following compositions are prepared:

(a)

9.9 parts of a copolymer containing 90% acrylonitrile and 10% of vinyl acetate
40.0 parts of dimethyl methoxy acetamide and 0.1 part of stannous chloride (b)

10.0 parts of the same copolymer as in (a)
40.0 parts of dimethyl methoxy acetamide The two compositions (a) and (b) were heated for the same duration of time and cast into films under the same conditions. The composition (a) gave a nearly colourless film, whereas composition (b) gave a yellow-brown coloured film.

We claim:

A new composition containing a polymer of 85% to 100% acrylonitrile and up to 15% of at least one ethylenically unsaturated monomer copolymerizable therewith, an organic solvent therefor and tin in the form of a stannous salt selected from the group consisting of stannous chloride, stannous oxalate and stannous formate, the amount of tin being 0.005 to 15% by weight of the polymer in the composition.

References Cited in the file of this patent

UNITED STATES PATENTS

| 2,581,924 | Smith et al. | Jan. 8, 1952 |
| 2,585,672 | Mosse | Feb. 12, 1952 |
| 2,617,784 | Slocombe | Nov. 11, 1952 |